(12) United States Patent
Heide et al.

(10) Patent No.: US 6,404,381 B1
(45) Date of Patent: Jun. 11, 2002

(54) RADAR SENSOR DEVICE

(75) Inventors: Patric Heide, Neubiberg; Martin Kunert, Neutraubling, both of (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/630,148

(22) Filed: Jul. 31, 2000

Related U.S. Application Data

(63) Continuation of application No. PCT/DE99/00216, filed on Jan. 27, 1999.

(30) Foreign Application Priority Data

Jan. 30, 1998 (DE) .......................... 198 03 660

(51) Int. Cl.[7] .......................... G01S 13/32; G01S 7/35
(52) U.S. Cl. .......................... 342/109; 342/128
(58) Field of Search .......................... 342/104, 107, 342/109, 118, 128, 85, 130

(56) References Cited

U.S. PATENT DOCUMENTS 5,287,111 A 2/1994 Shpater
5,301,553 A * 4/1994 Schultz et al. .......... 73/705
5,325,097 A 6/1994 Zhang et al.

FOREIGN PATENT DOCUMENTS

| DE | 38 30 992 C2 | 8/1991 |
| DE | 195 38 309 A1 | 4/1997 |
| EP | 0 758 093 A2 | 2/1997 |
| FR | 2 751 421 | 1/1998 |
| GB | 2 315 941 A | 2/1998 |

* cited by examiner

*Primary Examiner*—Ian J. Lobo
(74) *Attorney, Agent, or Firm*—Laurence A. Greenberg; Werner H. Stemer; Gregory L. Mayback

(57) ABSTRACT

A radar sensor device for detecting the distance and/or the speed of an object relative to the sensor device is provided with an oscillator, which can be frequency detuned through the use of a modulation function. The radar sensor device has a power switch, which can be driven by a power control function, for varying the transmitter power. The sensor device is to be operated in an alternating fashion, through the use of a variable setting of the modulation and power control functions, in at least two different, mutually overlapping operating modes which are tuned to different measuring ranges of the sensor device.

13 Claims, 3 Drawing Sheets

RADAR SENSOR DEVICE

CROSS-REFERENCE TO RELATED APPLICATION

This application is a continuation of copending International Application No. PCT/DE99/00216, filed Jan. 27, 1999, which designated the United States.

BACKGROUND OF THE INVENTION

Field of the Invention

The invention relates to a radar sensor device for detecting the distance and/or the speed of an object relative to the sensor device.

Radar technology is particularly suitable for use in motor vehicles and in industrial applications for a contactless detection of object data such as range, speed, state or presence. The functionality, measuring accuracy and production costs of radar sensors depend in this case substantially on the modulation methods applied and on the associated radar signal processing. The respective constraints of an application determine the configuration of the components of a radar sensor device and thus, for example, the complexity or simplicity of the electronics used in this case.

A contactless measurement of distance and speed with the aid of radar has been practiced for many years, mainly in military technology. In this connection, two different standard modulation methods are known for distance measurement, specifically pulse modulation and frequency modulation.

In the pulse travel time method, a short radar pulse is emitted in the direction of a measurement object and is received again as a pulse reflected from an object after a specific travel time. The travel time of the radar pulse is directly proportional to the distance from the measurement object.

In the case of the frequency method, a frequency-modulated radar signal is emitted and is received with a phase shift or frequency shift. The measured phase or frequency difference, which is typically in the kHz region, is proportional to the object distance. A requirement for this is a temporally linear frequency modulation.

Theoretically, the measured values obtained by the pulse travel time method on the one hand and the frequency method on the other hand are equivalent. In practice, however, the methods have specific advantages and disadvantages with reference to the parameters for the sensor measuring accuracy and the achievable structural resolution which are of relevance in practice. These parameters are first and foremost the modulation bandwidth and the radar transmitted/received power. For these parameters, which determine the structural resolution and range, there are radio approval regulations and technically and economically relevant constraints or boundary conditions, in particular with regard to the functioning and the outlay on circuitry. In this context there may be mentioned, for example, the frequency bands, which can be used for short-range monitoring with the aid of radar sensors, from 24.0 to 24.25, from 61.0 to 61.5 and from 76.0 to 77.0 GHz, to which the radar parameters mentioned below also relate.

For the application of the measurements of distance and speed of objects in the surroundings of a motor vehicle, a physical structural resolution of <15 cm is required for a measuring range of 0 to 5 meters (short range). A modulation bandwidth of >1 GHz is required for this purpose. A pulse duration of <1 ns is required in the case of an appropriate pulse method. The generation of the abovementioned radar signals with a duration of a few 100 ps, a bandwidth >1 GHz and a radar central frequency at, for example, 24 or 77 GHz entails a not inconsiderable technical outlay.

For reasons of costs, known radar sensor devices for industrial applications—for example a filling level radar—and traffic applications—for example a motor vehicle distance radar—mainly use frequency-modulated methods, since in this case a flexible and very precise digital signal processing is possible. Furthermore, a high range of up to approximately 100 m is achieved even for objects of low reflectivity.

U.S. Pat. No. 5,325,097 discloses a radar system for road vehicles which distinguishes between dangerous and non-dangerous target objects inside a predetermined zone. This system uses a pair of frequency-modulated continuous wave radar cycles and a single continuous wave cycle in generating radar signals for measuring the target region and the apparent target speed. Measured values from the FM/CW (frequency modulation/continuous wave) and CW (continuous wave) cycles are used with predetermined values for distinguishing between dangerous and non-dangerous target objects. With reference to its configuration, the system known from U.S. Pat. No. 5,325,097 has a frequency-detunable oscillator, which can be driven electronically through the use of a modulation function, for generating a transmitted signal, a transmitting antenna for emitting the transmitted signal, a receiving antenna for receiving the radar received signal reflected by the target, a demodulation unit for forming a demodulated received measuring signal, and a control unit in the form of a digital processor, which serves to control the sensor device and, above all, to control the modulator, and to evaluate the received signal.

German Patent No. DE 38 30 992 C2 discloses a radar altimeter which is configured using the FM-CW principle. The power of the transmission path of the radar equipment used in this case can be controlled by a variable attenuator connected upstream of a power amplifier, specifically as a function of the altitude and, in particular flight altitude of the aircraft equipped with the radar altimeter. It is clear that the radar equipment is always to be operated with as little radar energy as possible, in order to keep the detectability by extraneous sensors as low as possible, which is important, in particular, in the case of military applications.

Despite their practical applicability, for various reasons the known radar sensor devices explained above and based on a pulse or frequency method are unsuitable for the detection tasks at short range, which are of interest in conjunction with the present invention. Specifically, in the case of the present invention, strongly differing measuring requirements, such as near and remote targets, low and high object speeds and different object reflectivities occur. These measuring requirements must be fulfilled simultaneously.

Published, Non-Prosecuted German Patent Application No. DE 195 38 309 A discloses a radar sensor device for measuring distances and relative speeds between a vehicle and one or more obstacles, which has an oscillator for generating a transmitted signal whose frequency can be varied through the use of a control modulation voltage. Radar signals are emitted via a transceiver antenna, and radar received signals reflected by an object to be detected are received. The received signal is demodulated by a single-channel mixer and evaluated in a signal processing device.

From U.S. Pat. No. 5, 287, 111 it is further known in principle to vary the detection range of radar sensors by varying the transmitter power.

SUMMARY OF THE INVENTION

It is accordingly an object of the invention to provide a radar sensor device which overcomes the above-mentioned disadvantages of the heretofore-known devices of this general type and which has a high flexibility and, in particular, effective applicability at short range in conjunction with an acceptable outlay on circuitry.

With the foregoing and other objects in view there is provided, in accordance with the invention, a radar sensor device for detecting a distance and/or a speed of an object relative to the radar sensor device, including:

- a frequency-detunable oscillator operating with a given frequency and a given phase for generating a transmitted signal;
- a transmitting antenna, connected to the frequency-detunable oscillator, for emitting a radar signal based on the transmitted signal;
- a receiving antenna for receiving a radar received signal reflected by an object to be detected;
- a demodulation unit, connected to the frequency-detunable oscillator and to the receiving antenna, for forming a demodulated received measuring signal from the transmitted signal and the radar received signal;
- a control unit, connected to the frequency-detunable oscillator, for electronically driving the frequency-detunable oscillator with a modulation function and for evaluating the demodulated received measuring signal;
- a power switch connected between the frequency-detunable oscillator and the transmitting antenna, the control unit driving the power switch with a power control function for varying a transmitter power for the transmitting antenna;
- a reference unit assigned to the frequency-detunable oscillator, the reference unit generating a reference signal for monitoring the given frequency and the given phase of the frequency-detunable oscillator; and
- the control unit setting the modulation function and the power control function in a variable manner, and controlling the frequency-detunable oscillator and the power switch alternatingly in at least two different, mutually overlapping operating modes tuned to different measuring ranges.

Accordingly, a combined and flexible modulation method is used in the case of the radar sensor device according to the invention, the sensor device can be operated by a variable setting, performed by a control unit, of a modulation and power control function in an alternating fashion in at least two different, mutually overlapping operating modes. In this case, an electronically drivable, frequency-detunable oscillator is driven with the aid of the modulation function in order to generate a transmitted signal for a transmitting antenna. The power control function controls a power switch which is connected between the oscillator and the transmitting antenna for the purpose of varying the transmitter power. The radar received signal generated by the receiving antenna is combined together with the transmitted signal in a demodulation unit to form a demodulated received measuring signal. The latter can be evaluated by the control unit S mentioned above. The control unit serves simultaneously to control the entire sensor device. It is possible for the control unit to monitor the frequency and phase of the oscillator through the use of a reference unit assigned to the oscillator.

Due to this basic configuration of the radar sensor device, the radar parameters of "bandwidth" and "power" can be adaptively set through the use of the control unit in the two overlapping operating modes by appropriately driving the power switch and the oscillator. For a distance measurement at short range, the operation is performed through the use of a frequency-modulated operating mode of reduced transmitter power but, in return, of higher bandwidth on which there is superimposed for speed measurement both at short range and at long range an operating mode with fixed frequency operation and normal output power. It is to be noted in this case that the transmitter power of the sensor device can be varied in accordance with the currently obtaining reflectivity of the detected objects due to the fact that the power switch can be driven variably. This avoids overdriving of the receiving elements. The dynamic range of the sensor device can therefore be set adaptively in an optimum fashion with reference to a respective situation.

In accordance with another feature of the invention, the control unit controls the frequency-detunable oscillator and the power switch for generating, in an alternating clocked sequence, a monofrequency transmitted signal in a CW operation mode, and a frequency-modulated transmitted signal in an FM operation mode.

In accordance with yet another feature of the invention, the control unit adaptively drives the frequency-detunable oscillator and the power switch by setting the modulation function and the power control function such that, in an FM operation mode, the transmitter power is reduced to a low power level and the given frequency is modulated in a wide bandwidth for detecting a distance of an object at short range, and such that, in a CW operation mode, the transmitter power is not reduced and remains at a high power level and the given frequency is a fixed frequency associated with a narrow bandwidth for detecting a speed of an object at least at long range, the high power level being higher than the low power level and the wide bandwidth being wider than the narrow bandwidth.

In accordance with another feature of the invention, the control unit selectively sets the modulation function as a amp-shaped modulation function in the FM operation mode, and as a constant modulation function in the CW operation mode.

In accordance with a further feature of the invention, the control unit sets the power control function as an amplitude switching function for switching between two radar power levels.

In accordance with another feature of the invention, the control unit sets the amplitude switching function with a given switching rate and the modulation function with a given modulation rate such that the given switching rate is higher than the given modulation rate.

In accordance with yet another feature of the invention, the frequency-detunable oscillator and the power switch define a transmission path; the transmitting antenna is separate from the receiving antenna; the demodulation unit includes a power divider and a receiving mixer; the power divider is provided in the transmission path and separates off a portion of the transmitted signal for supplying a separated portion of the transmitted signal to the receiving mixer; and the receiving mixer is assigned to the receiving antenna and receives the separated portion of the transmitted signal and the radar received signal for forming the demodulated received measuring signal.

In accordance with another feature of the invention, the frequency-detunable oscillator and the power switch define a transmission path; the transmitting antenna and the receiving antenna form a combined transmitting/receiving antenna; and the demodulation unit is a bidirectional mixer provided in the transmission path.

In accordance with a further feature of the invention, the power switch is a switchable high-frequency amplifier, in particular a switchable high-frequency transistor.

In accordance with another feature of the invention, the radar sensor device includes a sample-and-hold unit connected downstream of the demodulation unit.

In accordance with another feature of the invention, the control unit sets the power control function as a clocked power switching function; and the sample-and-hold unit operates time-synchronized with respect to the clocked power switching function.

Other features which are considered as characteristic for the invention are set forth in the appended claims.

Although the invention is illustrated and described herein as embodied in a radar sensor device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
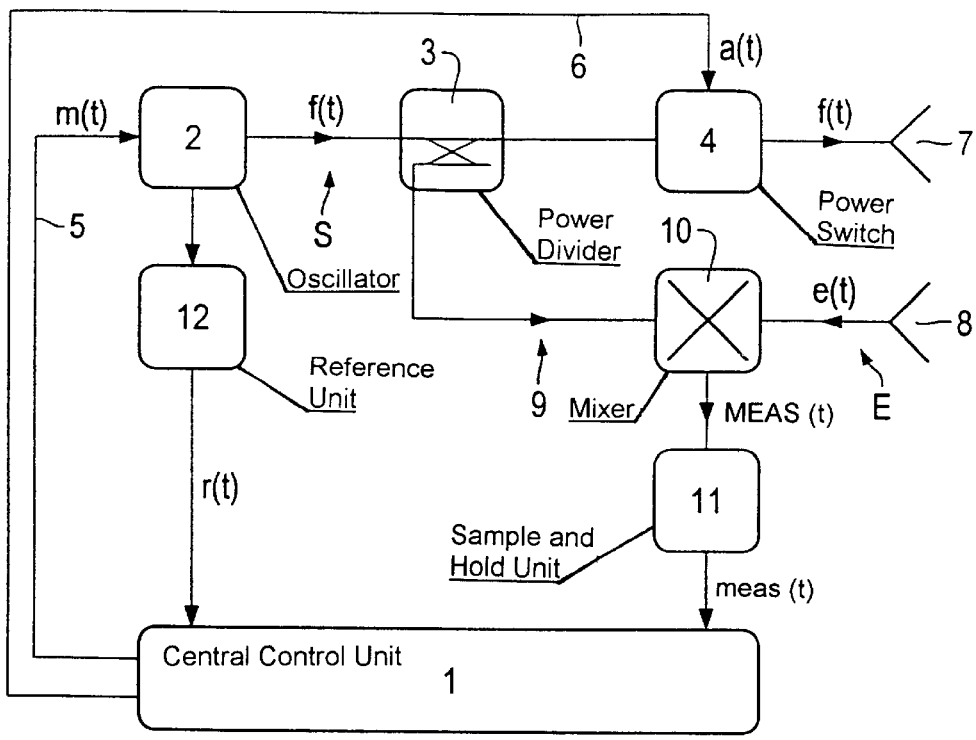
FIG. 1 is a block diagram of a radar sensor device according to a first embodiment of the invention.

Referring now to the figures of the drawings in detail and first, particularly, to FIG. 1 thereof, there is shown a radar sensor device with a central control unit 1 for controlling the entire electronic system of the sensor device and for evaluating measured values. This control unit 1 is operated in a way that is in principle known by using a microprocessor which has the usual internal components and interfaces. The functions of the control unit 1 are implemented by appropriate control software.

Provided in the transmission path S is an electronically frequency-detunable 24 GHz oscillator 2 which generates a transmitted signal f(t) whose frequency can be modulated. Connected downstream of the oscillator 2 is a power divider 3 which branches off a portion of the transmitted signal f(t) to the reception path E of the sensor device. The portion of the transmitted signal f(t) traversing in the transmission path S passes to the power circuit breaker or power switch 4, which can be configured as a switchable HF amplifier or, in the simplest case, as an HF transistor.

The oscillator 2 and the power circuit breaker or power switch 4 are connected to the control unit 1 via appropriate connecting lines 5, 6. A modulation function m(t), which is generated by the control unit 1, is fed to the oscillator 2 via the connecting line 5. Similarly, the control unit 1 transmits a control function a(t) to the power circuit breaker or power switch 4 via the connecting line 6. The frequency of the transmitted signal f(t) output by the oscillator 2 is controlled by the modulation function m(t) while the control function a(t) sets the power emitted by the sensor device via a transmitting antenna 7.

The reception path E has a receiving antenna 8 for receiving a radar received signal e(t) reflected by an object to be detected. This receiving antenna 8 is assigned a demodulation unit 9 which in the case of the exemplary embodiment shown in FIG. 1 is formed by the power divider 3 and the receiving mixer 10 connected between the power divider 3 and receiving antenna 8. The receiving mixer 10 forms from the received signal e(t) and the transmitted signal f(t) a demodulated measuring signal MEAS(t), which is fed to the evaluation section of the control unit 1 via a sample-and-hold unit 11. The sample-and-hold unit 11 in this case forms a continuous measuring signal meas(t) from the clocked measuring signal MEAS(t). The sample-and-hold unit 11 can may be configured as component of the control unit 1 itself.

Finally, there is also provided in the sensor device a reference unit 12 which is assigned to the oscillator 2 and has the task of generating a reference signal r(t) with the aid of which the frequency and phase of the oscillator 2 can be monitored by the control unit 1.

Because of its configuration, the radar sensor device discussed above can typically be operated in a so-called dual mode operation, that is to say the radar sensor is operated alternately in at least two operating modes. In an alternatingly clocked sequence, a monofrequency carrier signal (CW operating mode) and a frequency-modulated signal (FM operating mode) are emitted. In the CW operating mode, the Doppler effect is used to measure the speed of preferably quickly moving, remote objects with as high as possible a speed resolution and range, whereas in the FM operating mode the distance from near objects is intended to be measured with as high a distance resolution as possible. These measuring signals resulting in the two operating modes are spectrally evaluated, something which is undertaken, for example, by Fourier transformation, or else by alternative spectral analysis methods such as, for example, autoregressive methods.

Figure 2:
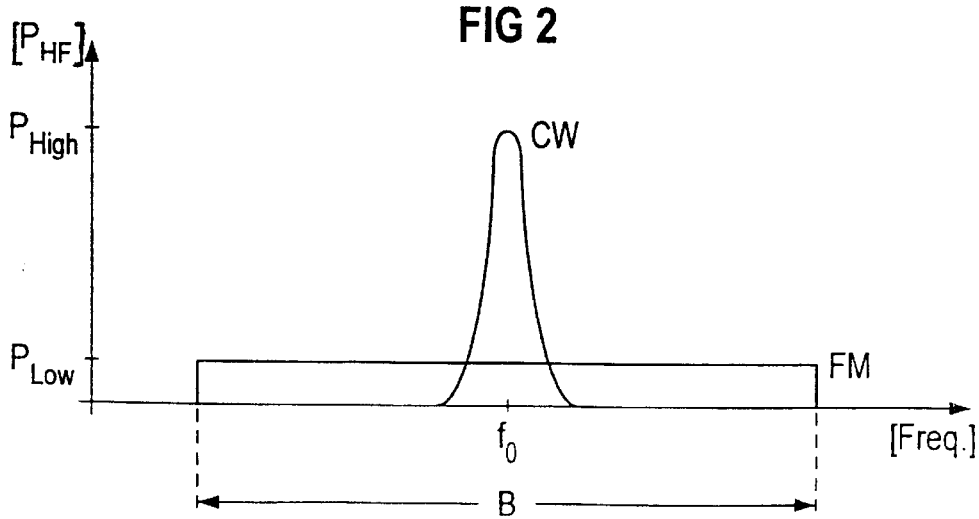
FIG. 2 is a graph illustrating the frequency-dependent transmitter power in so-called dual-mode operation.

In this case, the radar parameters of "bandwidth" and "power" are, as mentioned, adaptively set by the control unit 1 in the respective operating mode by appropriately driving the power circuit breaker 4 and the oscillator 2. In dual mode operation, this typically results in the frequency spectrum illustrated in FIG. 2: in the FM operating mode, a high bandwidth B about the center frequency $f_0$ and a low power level $P_{LOW}$ are employed. This selection of the radar parameters prioritizes a high resolution in distance measurement for close range measurements.

In the CW operating mode, only a small bandwidth about the center frequency $f_0$ is occupied, but a high power level $P_{HIGH}$ is used. The sensor device therefore achieves a large range and a high speed resolution.

The frequency spectrum described above in dual mode operation is achieved by driving the oscillator 2 and power circuit breaker 4 appropriately with the aid of the modulation function m(t) output by the control unit 1 and the control function a(t). This is illustrated in more detail in FIG. 3. In the two synchronously superimposed timing diagrams, the modulation function m(t) and the transmitted signal f(t)

resulting therefrom are illustrated in terms of a frequency response in the upper diagram. The lower diagram shows the control function a(t) and the radar power $P_{HF}$ controlled via the power circuit breaker 4.

As may be seen from the diagram, the modulation function m(t) is constant in the CW operating mode, and this yields a constant radar frequency $f_0$. The control function a(t) switches over between the two radar power levels $P_{LOW}$ and $P_{HIGH}$, the power level $P_{HIGH}$ preferably being set constant in the CW operating mode.

At the instant t1, the switchover is made into the FM operating mode, in the case of which the modulation function m(t) varies in the form of a rising and falling ramp, with the result that the frequency of the transmitted signal f(t) moves to and fro between the lower cut-off frequency $f_{LOW}$ and the upper cut-off frequency $f_{HIGH}$. It may be seen from the lower part of FIG. 3 that the radar power level $P_{HF}$ is switched over from high level $P_{HIGH}$ to low level $P_{LOW}$ on the basis of the control function a(t).

At the instant t2, there is a renewed switchover to the CW operation.

Figure 3:
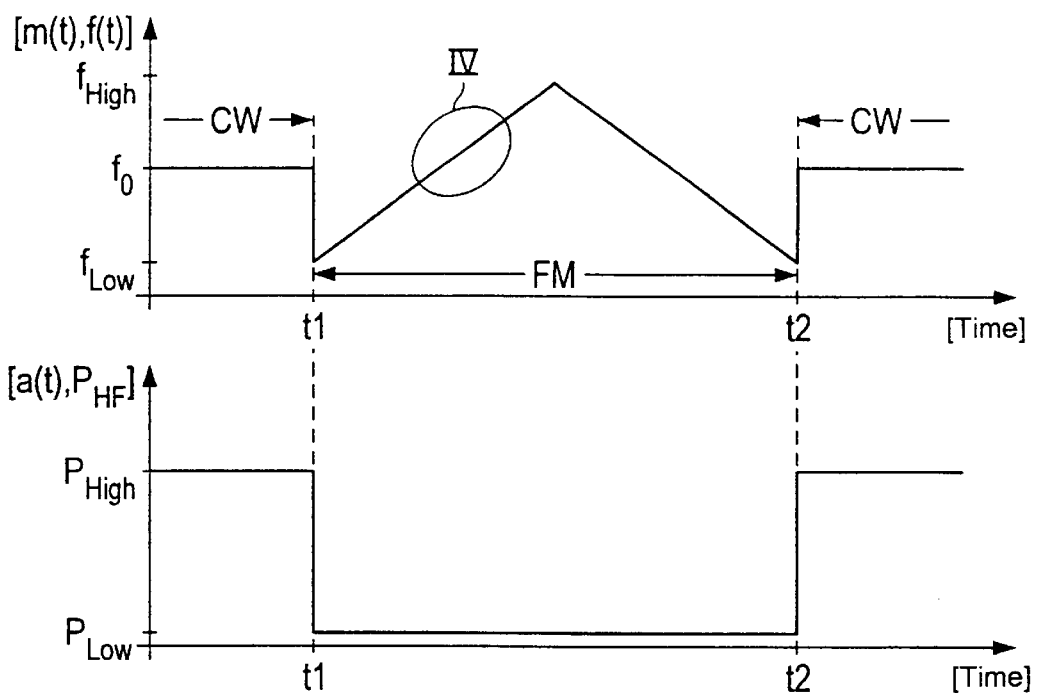
FIG. 3 are two graphs which are overlaid in a synchronous manner for illustrating the temporal characteristic of the modulation function and the power control function.

The modulation function m(t) in FM operation is shown in FIG. 3 as a linearly rising and falling ramp. The normally non-linear frequency/voltage characteristic of the oscillator 2 can be taken into account in practice by a predistortion of the modulation function m(t). This can be performed by a software correction in the control program of the control unit 1 or by an analog/digital control loop.

Finally, it is pointed out that, if the power circuit breaker 4 is configured as an HF transistor, the control function a(t) can be implemented by switching the operating voltage of the transistor on and off. The use of an HF transistor has in addition the advantage that in both switching states the power circuit breaker 4 is not conductive in the reverse direction, that is to say from the transmitting antenna 7 to the power divider 3, as a result of which the isolation of the transmitted signal f(t) and received signal e(t) can be enhanced.

The switching rate between the CW and FM operating modes varies in dependence of the respective situation and lies, specific to the respective application, in the Hz to kHz range.

Figure 4:
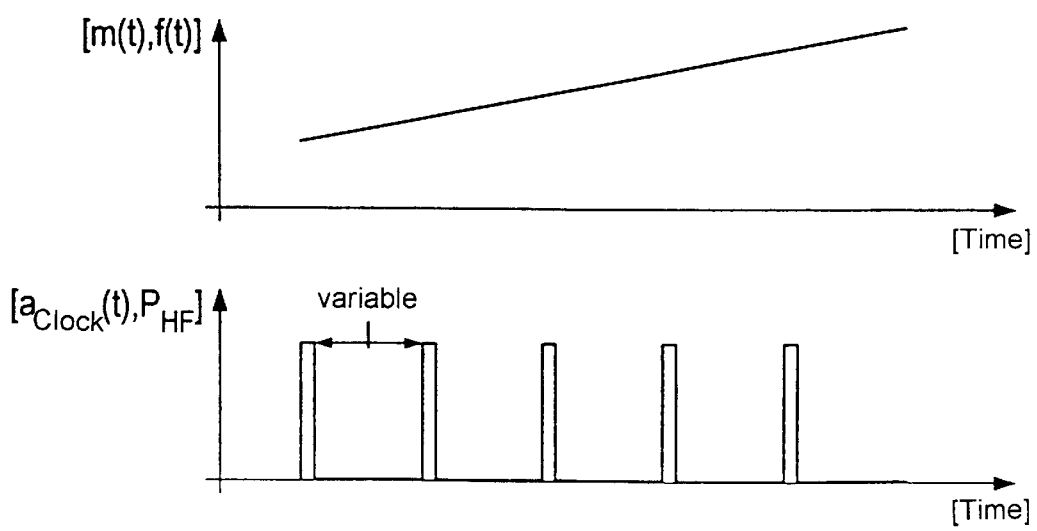
FIG. 4 are two graphs, analog to FIG. 3, for illustrating a power control function which generates a clocked mode.

An alternative configuration of the control function a(t) is illustrated in the diagrams according to FIG. 4. The time axis is greatly extended in this case by comparison with the illustration in FIG. 3. Thus, the duration covered by FIG. 4 corresponds to the region circled by an oval and denoted by IV in FIG. 3. As may be seen from the lower diagram in FIG. 4, the power circuit breaker 4 is driven with the aid of a fast clock signal $a_{CLOCK}(t)$, via the pulse duty factor of which the man radar power can be set. Thus, short measuring pulses are emitted in a fashion similar to a pulsed radar. The shorter the measuring pulses, the lower is the emitted mean radar power, and the smaller the sensor range. A clocked measuring signal MEAS(t) results on the receiving side. It follows from comparison with the modulation function m(t) that the emitted radar frequency varies slowly compared to the clock rate, as a result of which a plurality of measuring pulses are emitted in practice for each radar frequency and the corresponding received signals can be evaluated.

A substantial difference from the conventional pulse radar lies, however, in that the pulse duration is distinctly longer than the travel time of the radar measuring pulses. Since, however, the structural resolution in the case of distance measurement is not determined by the pulse duration, but by the frequency modulation bandwidth, it is not necessary to generate particularly short pulses. As a result, the technical requirements and the costs of the radar sensor device are reduced.

Figure 5:
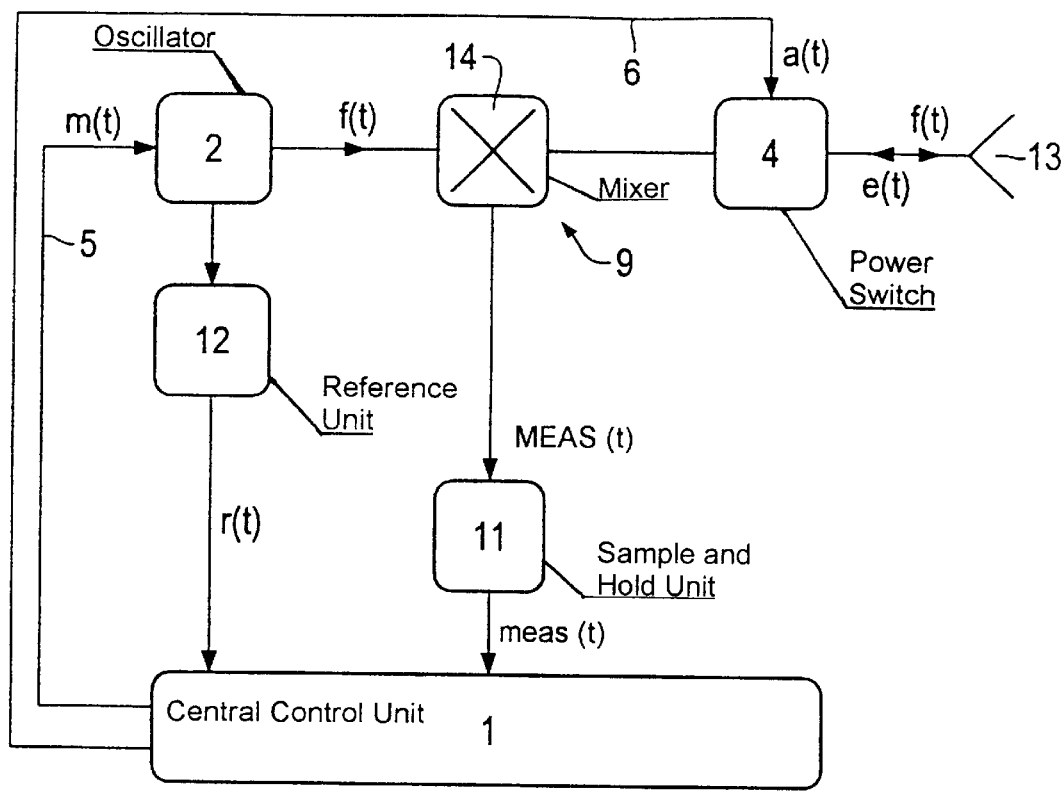
FIG. 5 is a block diagram of a radar sensor device according to a second embodiment of the invention.

A second embodiment of the radar sensor device, in the case of which a combined transceiving antenna 13 is used instead of separate sensor and receiving antennas is illustrated in FIG. 5. In the case of such a monostatic configuration, a bidirectional mixer 14 is inserted as demodulation unit 9 between the oscillator 2 and power circuit breaker or power switch 4. The bidirectional mixer 14 may for example be a Schottky diode. This bidirectional mixer 14 transmits a portion of the transmitted signal f(t) to the power circuit breaker 4 and further to the antenna 13, and forms a demodulated measuring signal MEAS(t) from the reflected radar received signal e(t) and the transmitted signal f(t). The power circuit breaker 4 is controlled, in turn, by the control function a(t) and is an element which is bidirectionally conductive in a first circuit state and blocks bidirectionally in a second circuit state. The further components of the sensor device illustrated in FIG. 5 correspond to those shown FIG. 1 and are provided with identical reference symbols so that reference is made to the description of FIG. 1.

We claim:

1. A radar sensor device for detecting at least one of a distance and a speed of an object relative to the radar sensor device, comprising:
    a frequency-detunable oscillator operating with a given frequency and a given phase for generating a transmitted signal;
    a transmitting antenna, connected to said frequency-detunable oscillator, for emitting a radar signal based on the transmitted signal;
    a receiving antenna for receiving a radar received signal reflected by an object to be detected;
    a demodulation unit, connected to said frequency-detunable oscillator and to said receiving antenna, for forming a demodulated received measuring signal from the transmitted signal and the radar received signal;
    a control unit, connected to said frequency-detunable oscillator, for electronically driving said frequency-detunable oscillator with a modulation function and for evaluating the demodulated received measuring signal;
    a power switch connected between said frequency-detunable oscillator and said transmitting antenna, said control unit driving said power switch with a power control function for varying a transmitter power for said transmitting antenna;
    a reference unit assigned to said frequency-detunable oscillator, said reference unit generating a reference signal for monitoring the given frequency and the given phase of said frequency-detunable oscillator; and
    said control unit setting the modulation function and the power control function in a variable manner, and controlling said frequency-detunable oscillator and said power switch alternatingly in at least two different, mutually overlapping operating modes tuned to different measuring ranges.

2. The radar sensor device according to claim 1, wherein said control unit controls said frequency-detunable oscillator and said power switch for generating, in an alternating clocked sequence, a monofrequency transmitted signal in a CW operation mode, and a frequency-modulated transmitted signal in an FM operation mode.

3. The radar sensor device according to claim 1, wherein said control unit adaptively drives said frequency-detunable oscillator and said power switch by setting the modulation function and the power control function such that, in an FM operation mode, the transmitter power is reduced to a low power level and the given frequency is modulated in a wide bandwidth for detecting a distance of an object at short range, and such that, in a CW operation mode, the transmitter power is not reduced and remains at a high power level and the given frequency is a fixed frequency associated with a narrow bandwidth for detecting a speed of an object at least at long range, the high power level being higher than the low power level and the wide bandwidth being wider than the narrow bandwidth.

4. The radar sensor device according to claim 2, wherein said control unit selectively sets the modulation function as a ramp-shaped modulation function in the FM operation mode, and as a constant modulation function in the CW operation mode.

5. The radar sensor device according to claim 3, wherein said control unit selectively sets the modulation function as a ramp-shaped modulation function in the FM operation mode, and as a constant modulation function in the CW operation mode.

6. The radar sensor device according to claim 1, wherein said control unit sets the power control function as an amplitude switching function for switching between two radar power levels.

7. The radar sensor device according to claim 6, wherein said control unit sets the amplitude switching function with a given switching rate and the modulation function with a given modulation rate such that the given switching rate is higher than the given modulation rate.

8. The radar sensor device according to claim 1, wherein:
said frequency-detunable oscillator and said power switch define a transmission path;
said transmitting antenna is separate from said receiving antenna; and
said demodulation unit includes a power divider and a receiving mixer;
said power divider is provided in the transmission path and separates off a portion of the transmitted signal for supplying a separated portion of the transmitted signal to said receiving mixer; and
said receiving mixer is assigned to said receiving antenna and receives the separated portion of the transmitted signal and the radar received signal for forming the demodulated received measuring signal.

9. The radar sensor device according to claim 1, wherein:
said frequency-detunable oscillator and said power switch define a transmission path;
said transmitting antenna and said receiving antenna form a combined transmitting/receiving antenna; and
said demodulation unit is a bidirectional mixer provided in the transmission path.

10. The radar sensor device according to claim 1, wherein said power switch is a switchable high-frequency amplifier.

11. The radar sensor device according to claim 1, wherein said power switch is a switchable high-frequency transistor.

12. The radar sensor device according to claim 1, including a sample-and-hold unit connected downstream of said demodulation unit.

13. The radar sensor device according to claim 12, wherein:
said control unit sets the power control function as a clocked power switching function; and
said sample-and-hold unit operates time-synchronized with respect to the clocked power switching function.

* * * * *